United States Patent [19]
Witkin

[11] Patent Number: 5,870,788
[45] Date of Patent: Feb. 16, 1999

[54] PORTABLE RAMP DEVICE

[76] Inventor: Roy T. Witkin, 8 Beachside Ave., Westport, Conn. 06880

[21] Appl. No.: 882,443

[22] Filed: Jun. 25, 1997

[51] Int. Cl.[6] ........................................................ E01D 1/00
[52] U.S. Cl. ........................... 14/69.5; 414/921; 105/447; D25/62
[58] Field of Search ..................................... 14/69.5, 71.1; 414/921; 254/88; 105/436, 447, 448; D25/62

[56] References Cited

U.S. PATENT DOCUMENTS

| 2,461,678 | 2/1949 | Christensen | 14/69.5 |
|---|---|---|---|
| 3,873,064 | 3/1975 | Lundman | 254/88 |
| 3,915,430 | 10/1975 | Chromy et al. | 254/88 |
| 3,994,474 | 11/1976 | Finkbeiner | 254/88 |
| 4,912,796 | 4/1990 | Crump | 14/69.5 |
| 5,716,040 | 2/1998 | Torres | 254/88 |

OTHER PUBLICATIONS

AlumiRamp, Inc., "Modular Ramp Kit Systems," www.alumiramp.com/quick.htm, undated.
AccessAbility, "Product Range," www.netlink.co.uk/users/aduncan, undated.
Jetmarine, "Access made easy," www.jetmarine.co.uk, undated.

*Primary Examiner*—Tamara L. Graysay
*Assistant Examiner*—Gary S. Hartmann
*Attorney, Agent, or Firm*—Graham & James LLP

[57] ABSTRACT

A portable ramp for use in allowing access for the disabled, in a wheelchair, to enter an automobile, elevated area and the like or for similar entry use by a pet. The ramp is comprised of a platform member having folding legs and a ramp hingedly attached thereto with ramp elements, each having a bevelled end for selective length placement of ramp elements on a ground surface (with other non-used elements being folded or positioned within the elements being used for the ramp). With the ramp elements being foldable into each other and the platform legs being foldable thereinto, the ramp element and platform are foldable into a readily carryable attaché configuration.

9 Claims, 2 Drawing Sheets

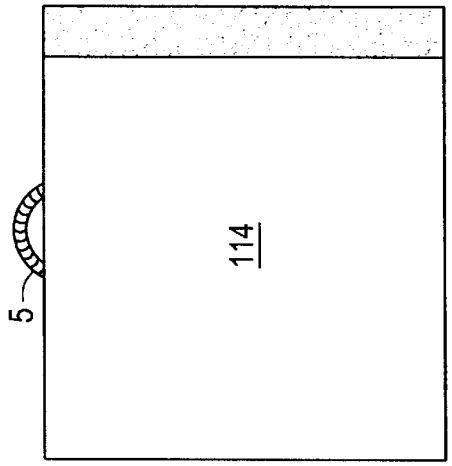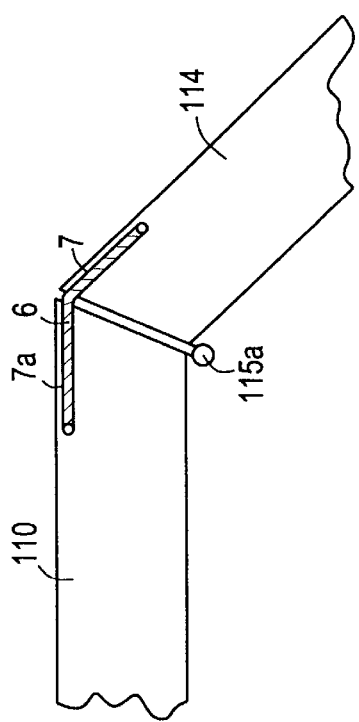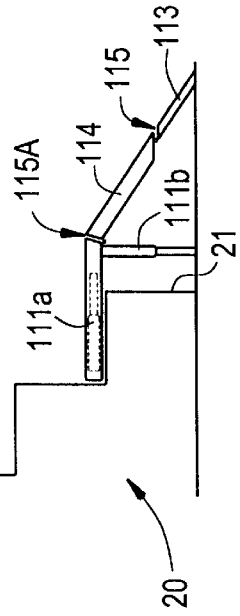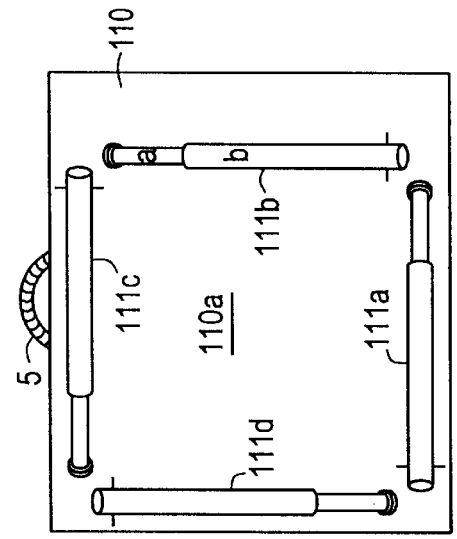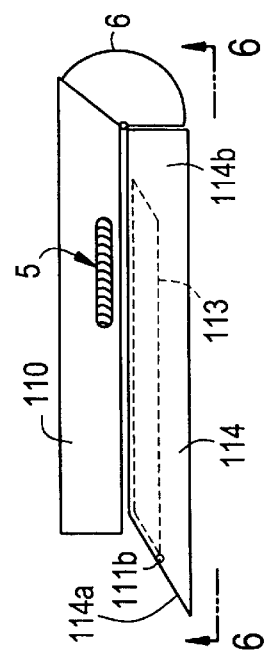

PORTABLE RAMP DEVICE

FIELD OF THE INVENTION

This invention relates to foldable portable ramps, and particularly to portable ramps used for wheelchair or pet access to elevated areas such as vehicles and low step elevations.

BACKGROUND OF THE INVENTION

Wheelchairs, while providing the disabled with capability of movement, are restricted in ready access to elevated areas such as automobiles, buses, vans and the like, wherein, though the elevation is slight, the wheelchair wheels are generally unable to negotiate the height. Accordingly a plethora of elevation ramps have been devised to permit wheelchair users to negotiate step level heights. However, the problem with many of such ramps, even if they are simply constructed of folding components, is the overly large weight and volume they occupy even when folded, making them difficult to transport for possibly occurring uses. In addition many of the ramps are unstable, especially if the ground surfaces upon which they are supported is not substantially flat.

SUMMARY OF THE INVENTION

It is therefore an object of the present invention to provide a portable ramp structure having lightweight folding, retracting, and member nesting elements for minimizing the transport size of the portable ramp and for permitting adaptable use thereof for various heights and terrains.

It is a further object of the present invention to provide such member nesting elements with configuration means for stability of placement, regardless of extension height and supporting terrain.

It is yet another object of the present invention to provide such portable ramp with at least two hinged ramp elements and a platform member integrated with the ramp members, and wherein the platform member comprises independent adjustable support members.

Generally the present invention comprises a portable adjustable ramp device with a platform member and a ramp member leading thereto and integrated therewith. The platform member comprises a level table section with at least two elongate or three or four standard, folding, height adjustable, e.g., telescopic with height lock, legs depending from the underside thereof. The ramp member comprises at least two angled ramp elements connected to each other, such as by hinges or telescopic extension, whereby ramp length can be adjusted in accordance with the number of elements being extended, and with unused ramp elements being hingedly folded or otherwise moved out of the way. Of the ramp elements, two of the elements are terminal elements. One terminal element is positioned adjacent the platform member or table section and is attached thereto, preferably hingedly, and the other terminal element is adjacent to and rests on the ground. Each of the elements, which can selectively be made to be the terminal element resting on the ground (to permit the selective length placement), further comprises a bevelled end adapted to substantially engage and be stably supported by a non-level ground surface. The angle of bevel is generally such that the bevelled end is substantially parallel to the table portion of the platform member. As a result, there is an increased contact area between the end of the ramp and the ground for is enhanced stability. The vertical height of the legs is adjustable, via height adjusting means, such as telescopic elements, to be made substantially equal to the vertical height of the ramp elements. The various elements and members of the ramp are collapsible or hingedly foldable and nestable into a compact attaché-like configuration for easy transport. Thus, the legs of the platform member are foldable into a space within the platform member and the ramp elements are nestable within one another to a minimal size.

The above objects and other objects, features and advantages of the present invention will become more evident from the following discussion and drawings in which:

SHORT DESCRIPTION OF THE DRAWINGS

FIG. 3a is the portable ramp device of FIG. 2 with platform legs folded for direct placement of the platform section on a step;

FIG. 4 is a bottom view of the platform section of FIG. 2, shown with the legs being folded therein for carrying and prior to folding of the collapsed ramp section thereon;

FIG. 5 is a side view of the portable ramp device as folded for carrying;

FIG. 6 is a view of the folded portable ramp device of FIG. 5 taken along line 6—6;

FIG. 7 is a sectioned side view showing use of a plastic shield for closing variations in angle openings between hinge-abutted ramp and table elements, caused by variations in ground angle placement.

DETAILED DESCRIPTION OF THE INVENTION

Generally the present invention comprises a portable ramp for use in allowing access for the disabled, in a wheelchair, to enter an automobile, or for similar entry use by a pet, or for any other small elevated height maneuvering not normally negotiable by the handicapped or disabled or even pets. In accordance with the present invention the ramp is comprised of a platform member having integral support means and which is also hingedly attached to at least two foldable inclined ramp elements which are hinged or otherwise collapsibly connected to each other. The ramp elements are preferably progressively slightly narrower in width and smaller in thickness, as they descend from the connection with the platform member, whereby lower ramp elements are configured to be hingedly nested or telescoped within higher elements. In order to effect the nesting of elements, the table element of the platform and the ramp elements (though not necessarily the lowermost one) are configured as troughs aligned with the adjacent hinges to permit the folding therein of adjacent ramp elements and the legs within the table element.

In a preferred embodiment, hinge placement at the abutted ends of the ramp elements is such that the element to be nested is movable thereby to be complete contained within the adjacent ramp element for compactness. The trough configuration also reduces the weight of the ramp device, with the walls of the respective trough structures providing reinforcing strength.

DETAILED DESCRIPTION OF THE PREFERRED EMBODIMENT AND THE DRAWINGS

Figure 1:
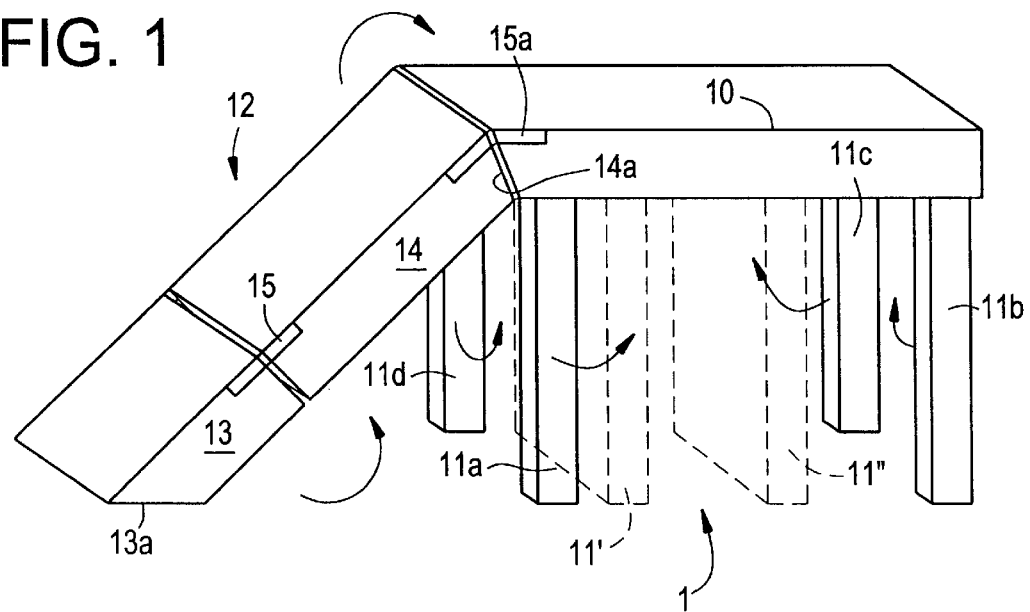
FIG. 1 is a schematic side view showing a first embodiment of the portable ramp of the present invention of a single height configuration and shown in extended use position.

With respect to the drawings, as shown in FIG. 1, the basic structure of the ramp device 1 of the present invention is comprised of platform member 10 having four legs 11a–d for the elevated support thereof (though only two legs-shown as 11' and 11", in dotted lines-are minimally required for support, and are included in the present invention), four legs are more amenable to stability and placement for folding). Ramp 12 leading to platform member 10 is shown as being comprised of ramp elements 13 and 14, connected by hinge member 15, which permits folding of element 13 (slightly narrower than element 14), into element 14. Hinge 15a between ramp element 14 and platform member 10 is hinged in the opposite direction from that of hinge 15 to permit folding storage. Legs 11a–d are foldable within platform member 10 as indicated by the arrows and similar to that shown in FIG. 4. Element 13 is bevelled at its terminal end 13a for full supportive engagement with the ground surface for maximum stability. Element 14 is bevelled at 14a, its abutted engagement with platform member 10, for supportive pressure thereagainst, under use load.

Figure 2:
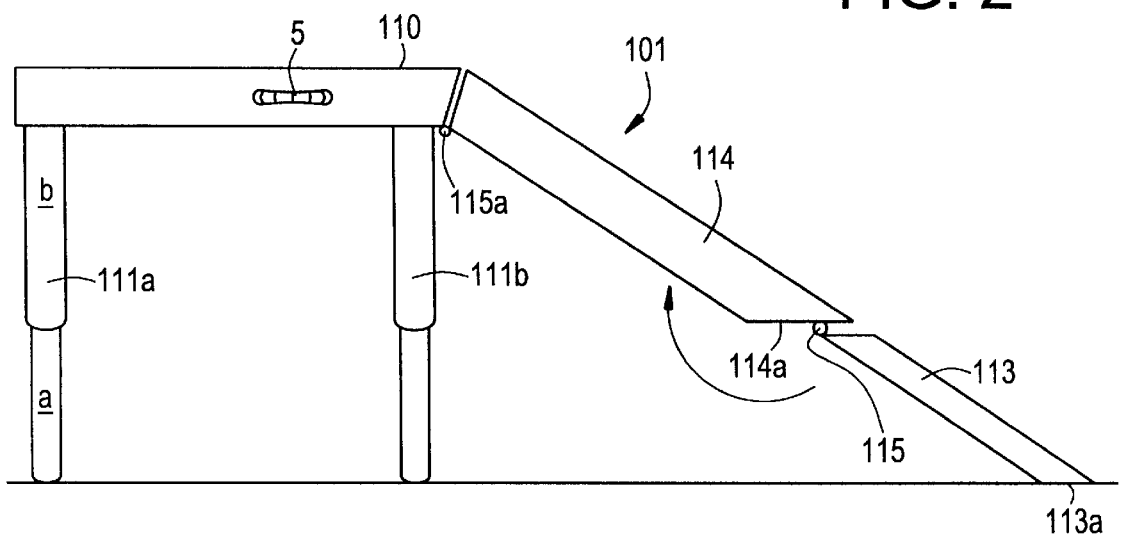
FIG. 2 is a schematic side view of a modified second embodiment of the present invention with adjustable height structure.
Figure 3:
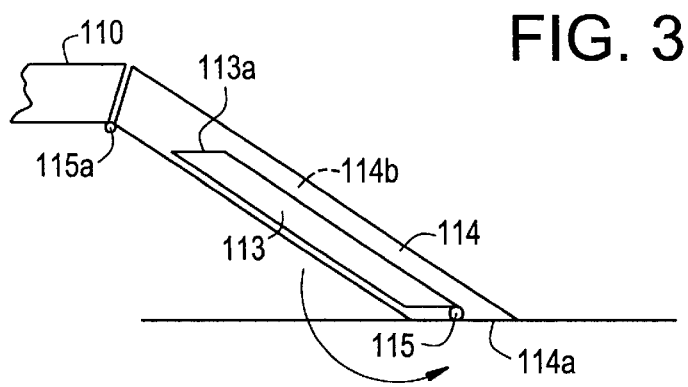
FIG. 3 is the portable ramp section of FIG. 2, shown adjusted for a lower height use.

The portable ramp device embodiment 101 of FIGS. 2 and 7, is structured to permit variable height uses (e.g. for one step level (FIG. 3), or two step levels (FIG. 2) or for vehicles with different entrance heights) with telescoping legs 111a–d, each comprised of sections a and b. Because of such variable height use, element 114, embodies bevelled end 114a in addition to the bevel end 113a of element 113, whereby either element 114 or 113 is able to be squarely seated on the ground support. To facilitate nested folding, element 113 is both narrower and thinner than ramp element 114, and hinged with hinge 115 midway on the thickness of bevelled end 114a, whereby, when not in use, element 113 is fully removed from the ramp structure by full containment within trough section 114b.

As shown in the application of use in FIG. 3a, nesting can be partial to effect an appropriate use. Thus, platform legs 111a and 111d are folded into platform 110 whereby the platform is directly placed on step 21 of staircase 20, for initial lifting of a wheelchair. This is a use embodiment particularly appropriate for sidewalks not having wheelchair use cutouts.

As seen in FIG. 4, during folding, for carrying or storage, telescoping legs 111a–d are telescoped closed to smaller size and folded into trough 110a of platform 110, and element 113 is folded into trough 114b. In this embodiment, ramp element 114 is hinged adjacent the opening of trough 110a into which legs 111a–d are folded by means of hinge 115a. Element 114 is thereby folded over the legs as shown in FIG. 5 with extension ramp element 113 also being enclosed between upper ramp element 114 and platform 110. As shown in FIG. 5, handle 5, laterally integrated with platform 10 provides a ready means for carrying the folded portable ramp.

In order to accommodate intermediate levels between the steps, hinge 115a can be offset from direct abutment as shown, with use of an integrated plastic spacer shield 6 as shown in FIG. 6 which is fitted into grooves 7 and 7a in element 114 and platform 110, respectively.

It is understood that the above discussion and specific examples disclosed in the drawings are only illustrative of the present invention and that changes may be made in the structure and interrelation of the elements without departing from the scope of the present invention as defined in the following claims.

What is claimed is:

1. A portable ramp device for placement on a supporting surface, with said portable ramp device comprising an elevated platform member and a ramp member leading thereto and hingedly integrated therewith; said platform member comprising a level table section with at least two legs depending from an underside thereof and collapsible to a reduced dimension therewith; wherein the ramp member comprises at least two separate and connected ramp elements foldable towards the platform member for compact carrying formation of the ramp device, with one of said ramp elements being positioned adjacent to and hingedly integrated with the platform member, and wherein when another of the ramp elements is positioned for contact with the supporting surface, a portion of the positioned ramp element, in contact with the supporting surface, comprises a bevelled end adapted to substantially engage and be stably supported by said supporting surface and wherein the bevelled end is substantially parallel to the table portion of the platform member.

2. A portable ramp device for placement on a supporting surface, with said portable ramp device comprising an elevated platform member and a ramp member leading thereto and hingedly integrated therewith; said platform member comprising a level table section with at least two collapsible legs depending from an underside thereof and collapsible to a reduced dimension therewith; wherein the ramp member comprises at least two interconnected separate ramp elements which are adapted to extend between the table section and the supporting surface, on which the device is placed, to provide a ramp surface, wherein the ramp member comprises means for adjusting ramp length in accordance with a number of ramp elements being extended and with unused ramp elements being positioned out of a way of said ramp surface and into adjacent ramp elements; wherein one of the ramp elements is hingedly connected to the platform member and wherein each of the ramp elements further comprises a bevelled end adapted to substantially engage and be stably supported by a level ground surface, to permit selective length placement; wherein an angle of bevel is generally such that the bevelled end is substantially parallel to the table portion of the platform member; and wherein a vertical height of the legs is adjustable to be substantially equal to a vertical height of the ramp elements.

3. The portable ramp device of claim 2, wherein each of the ramp elements is hingedly attached to an adjacent ramp element and wherein adjacent ramp elements are adapted to permit one of the adjacent elements to be nested within the other of said adjacent elements.

4. The portable ramp device of claim 2, wherein each of the ramp elements is telescopically attached to an adjacent ramp element and wherein adjacent ramp elements are adapted to permit one of the adjacent elements to be telescoped within the other of said adjacent elements.

5. The portable ramp device of claim 2, wherein the ramp elements are collapsible into the ramp element which is hingedly attached to the platform member; wherein the folding legs are collapsible within the platform member; and wherein the ramp element, hingedly attached to the platform member, is foldable relative to the platform member to form a compact attaché configuration for easy transport, with said folding legs and ramp elements collapsed within the ramp element, hingedly attached to the platform member, are contained between the platform member and the ramp element hingedly attached thereto, in said attaché like configuration.

6. The portable ramp device of claim 5, wherein position stabilizing means is provided between the ramp element hingedly attached to the platform member and the platform member adjacent the hinged attachment, with said position stabilizing means adjusting for different angled juxtapositions between the platform member and the ramp element hingedly adjacent thereto.

7. The portable ramp device of claim of claim 6 wherein said position stabilizing means comprises a plastic shield affixed to both the platform member and the ramp element adjacent thereto, in a position spanning the hinging between said platform member and ramp element.

8. The portable ramp device of claim 2, wherein at least one of said legs is collapsible relative to the table section whereby the table section is able to be stably levelly supported by an external platform surface.

9. The portable ramp device of claim 2, wherein at least one of said table section and said terminal ramp element, hingedly attached to the platform member, comprises a carrying handle on a lateral edge thereof.

* * * * *